United States Patent [19]
Kentish

[11] Patent Number: 5,818,746
[45] Date of Patent: Oct. 6, 1998

[54] DIGITAL SIGNAL PROCESSING

[75] Inventor: William Kentish, Chipping Norton, United Kingdom

[73] Assignee: Sony United Kingdom Limited, Weybridge, England

[21] Appl. No.: 729,770

[22] Filed: Oct. 8, 1996

Related U.S. Application Data

[63] Continuation of Ser. No. 389,064, Feb. 14, 1995, abandoned, which is a continuation of Ser. No. 95,198, Jul. 23, 1993, abandoned.

[30] Foreign Application Priority Data

Sep. 8, 1992 [GB] United Kingdom ............ 9218966

[51] Int. Cl.⁶ .................................................. G06F 7/50
[52] U.S. Cl. ............................................................ 364/768
[58] Field of Search ................................. 364/768, 751.5

[56] References Cited

U.S. PATENT DOCUMENTS

| | | |
|---|---|---|
| 3,751,650 | 8/1973 | Koehn . |
| 4,230,908 | 10/1980 | Davis et al. . |
| 4,803,649 | 2/1989 | Holzapfel et al. . |
| 4,849,921 | 7/1989 | Yasumoto et al. ............. 364/768 |
| 4,852,040 | 7/1989 | Oota ............................... 364/768 |
| 4,885,792 | 12/1989 | Christensen et al. . |
| 5,148,386 | 9/1992 | Hori .............................. 364/768 |
| 5,185,714 | 2/1993 | Nakayama .................. 364/750.5 |
| 5,305,249 | 4/1994 | Yoshida ........................ 364/768 |

FOREIGN PATENT DOCUMENTS

| | | |
|---|---|---|
| 0 098 692 | 1/1984 | European Pat. Off. . |
| 0 189 912 | 8/1986 | European Pat. Off. . |
| 0 468 534 | 1/1992 | European Pat. Off. . |
| 2 228 117 | 8/1990 | United Kingdom . |

*Primary Examiner*—Tan V. Mai
*Attorney, Agent, or Firm*—Frommer Lawrence & Haug LLP; William S. Frommer

[57] ABSTRACT

Digital signal processing apparatus for adding signals generates a plurality of intermediate digital signals from a plurality of input digital signals, each intermediate digital signal composed of a respective additive combination of the input digital signals, and includes a signal selector for selecting one of the intermediate digital signals, an output digital signal being dependent on the selected intermediate digital signal.

14 Claims, 2 Drawing Sheets

DIGITAL SIGNAL PROCESSING

This application is a continuation of application Ser. No. 08/389,064, filed Feb. 14, 1995, now abandoned which is a continuation of application Ser. No. 08/095,198 filed Jul. 23, 1993, now abandoned.

BACKGROUND OF THE INVENTION

1. Field of the Invention

This invention relates to digital signal processing.

2. Description of the Prior Art

Digital signal processing (DSP) functions, such as the mixing of digital audio signals, make use of additive crosspoint matrices to generate output signals by adding selected groups of input signals. A simple example of a previously proposed digital additive crosspoint matrix, in which two output digital signals "P" and "Q" each comprise selected additive combinations of two input digital signals "A" and "B", is shown schematically in the accompanying FIG. 1. In the present context an "additive combination" of the signals A and B is a linear summation of zero or more of the signals, and so encompasses the following possibilities: A, B, A+B and 0 (zero).

In the circuit of FIG. 1, the input signals A and B are supplied in parallel to two pairs of selectors (or gates) 10, 15 and 20, 25. Each of the selectors may be switched on or off by means of a respective selection signal. When a selector is switched on, the signal at the selector's input is passed to its output. A selector which is switched off has a constant output of logical zero. The outputs of the two pairs of selectors are passed to two adders 30, 35, the outputs of which form the signals P and Q.

The group of input signals used to generate a particular output signal can be varied under the control of the selection signals. For example, if the selector 10 is switched on and the selector 15 is switched off, the output of the adder 30 (i.e. the output signal P) is (B+0)=B. Similarly, if both of the selectors 20 and 25 are switched on, the output of the adder 35 (i.e. the output signal Q) is (A+B).

The example shown in FIG. 1 requires two adders to generate two output signals from two input signals. In general, if the matrix circuit of FIG. 1 is extended so that m output signals are generated from n input signals, m(n−1) adders are required. This means that for 8 input signals and 8 output signals the matrix would require 56 adders; for 64 input signals and 64 output signals the number of adders required would be 4032. Because adder circuits are generally more difficult to fabricate (and correspondingly more expensive) than, for example, selector circuits, it is an object of this invention to reduce the number of adders required in implementing a DSP circuit of the type described above.

SUMMARY OF THE INVENTION

This invention provides a digital signal processing apparatus for generating an output digital signal from a plurality of input digital signals, said apparatus comprising: means for generating a plurality of intermediate digital signals, each said intermediate digital signal comprising a respective additive combination of said input digital signals; and a signal selector for selecting one of said intermediate digital signals, said output digital signal being dependent on said selected intermediate digital signal.

In a digital signal processing apparatus according to the invention, intermediate digital signals representing various additive combinations of the input digital signals are generated first, with a selection then being made from the intermediate digital signals. In many cases this can reduce the number of adders required to implement a circuit such as a digital additive crosspoint matrix which, as described above, can reduce the fabrication costs of such a circuit.

It is envisaged that the output digital signal could simply be identical to the selected intermediate digital signal. Alternatively, some further signal processing could be applied to the selected intermediate digital signal to generate the output digital signal. It is also envisaged that a plurality of signal selectors could be employed, with a corresponding plurality of output signals being generated.

Although a particular circuit may require only certain additive combinations of the input digital signals to be available for output, an advantageously flexible arrangement is one in which the plurality of intermediate digital signals comprises all possible discrete additive combinations of at least a subset of the input digital signals.

The number of adders required to implement a particular digital additive crosspoint matrix circuit can, in at least some cases, be reduced further by employing means for generating at least two of said pluralities of intermediate digital signals from respective discrete subsets of the input digital signals; a plurality of signal selectors for selecting respective intermediate digital signals from each of the pluralities of intermediate digital signals; and means for combining the selected intermediate digital signals to generate the output digital signal.

Viewed from a second aspect this invention provides a method of generating an output digital signal from a plurality of input digital signals, said method comprising the steps of: generating a plurality of intermediate digital signals, each intermediate digital signal comprising a respective additive combination of said input digital signals; and selecting one of said intermediate digital signals, said output digital signal being dependent on said selected intermediate digital signal.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 2:
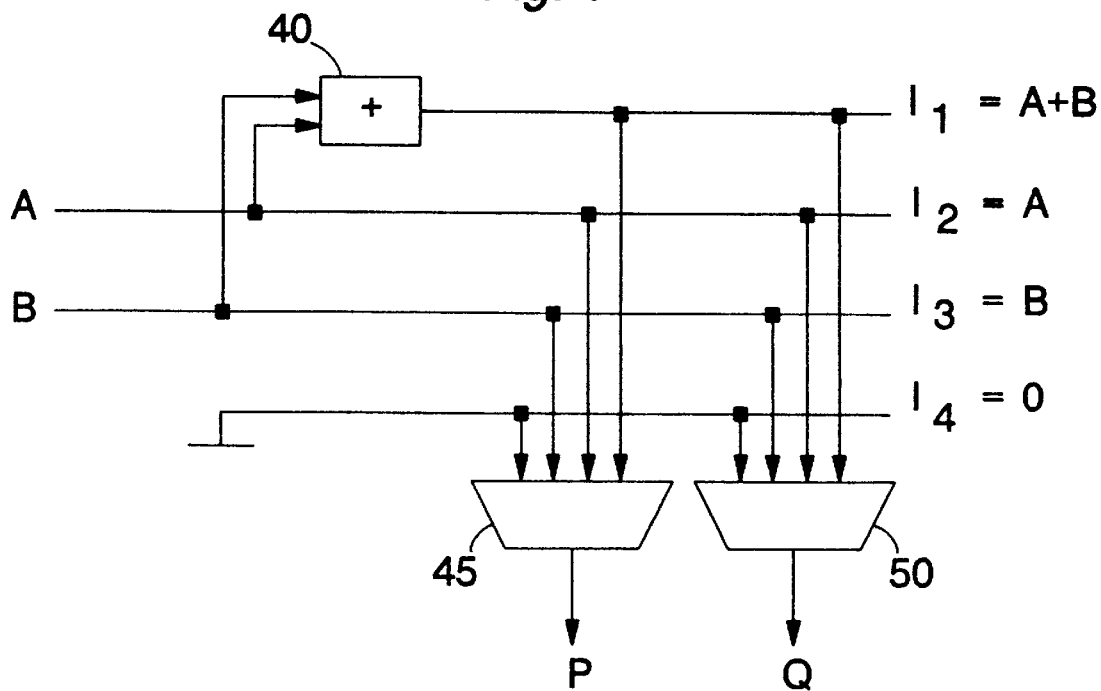
FIG. 2 is a schematic diagram of a digital additive crosspoint matrix according to the present invention.

Referring now to FIG. 2, a digital additive crosspoint matrix circuit is shown in which two input digital signals "A" and "B" are combined to form four intermediate digital signals $I_1$, $I_2$, $I_3$, and $I_4$. The four intermediate digital signals represent the four possible additive combinations of the two input signals A and B. In particular, $I_1$ is generated by an adder 40 and represents the sum of the input signals A and B; $I_2$ is equal to the input signal A; $I_3$ is equal to the input signal B; and $I_4$ is maintained at logical zero.

Two signal selectors 45, 50 are each supplied with the four intermediate digital signals $I_1$ to $I_4$. Each of the signal selectors is controllable to select one of the four intermediate signals for output. In the circuit shown in FIG. 2, an output signal "P" is selected by the signal selector 45 and an output signal "Q" is selected by the signal selector 50.

Figure 1:
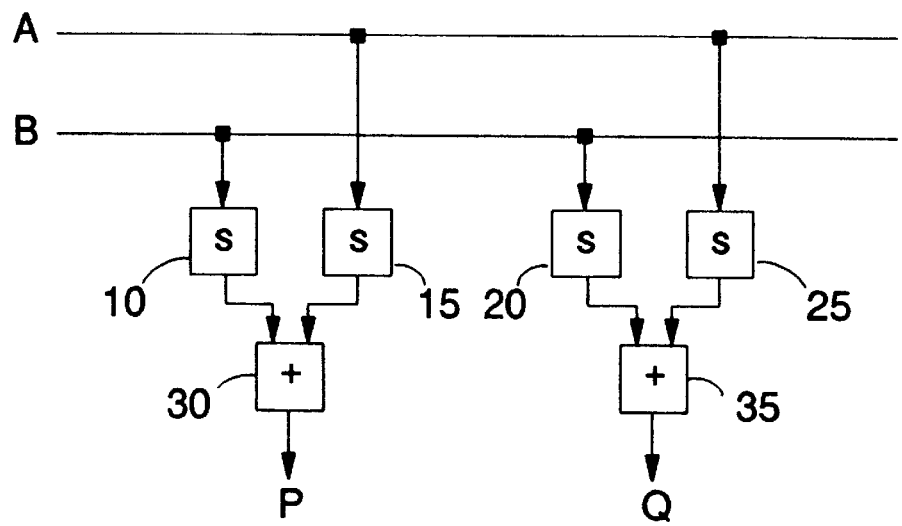
FIG. 1 is a schematic diagram of a previously proposed digital additive crosspoint matrix.

In FIG. 2, addition operations (e.g. the adder 40) are performed first, to generate intermediate signals representing the possible additive combinations of the input signals, before signal selection is performed by the signal selectors 45, 50. This contrasts with the arrangement shown in FIG. 1, in which signal selection is performed (by the signal selectors 10, 15, 20, 25) to determine, for each output signal, which of the input signals should be added to generate that output signal. It will be seen that in FIG. 2 only one adder 40 is required, whereas in FIG. 1 two adders 30, 35 are needed.

The signal selectors 45 and 50 in FIG. 2 select from a plurality of intermediate signals including the signal 14 (logical zero). However, if signal selectors having a default output of logical zero were used, the intermediate signal $I_4$ would not be required. Furthermore, if the apparatus of FIG. 2 is connected to subsequent signal processing apparatus, the signal selectors 45 and 50 may form part of the input circuitry of that subsequent signal processing apparatus.

Figure 3:
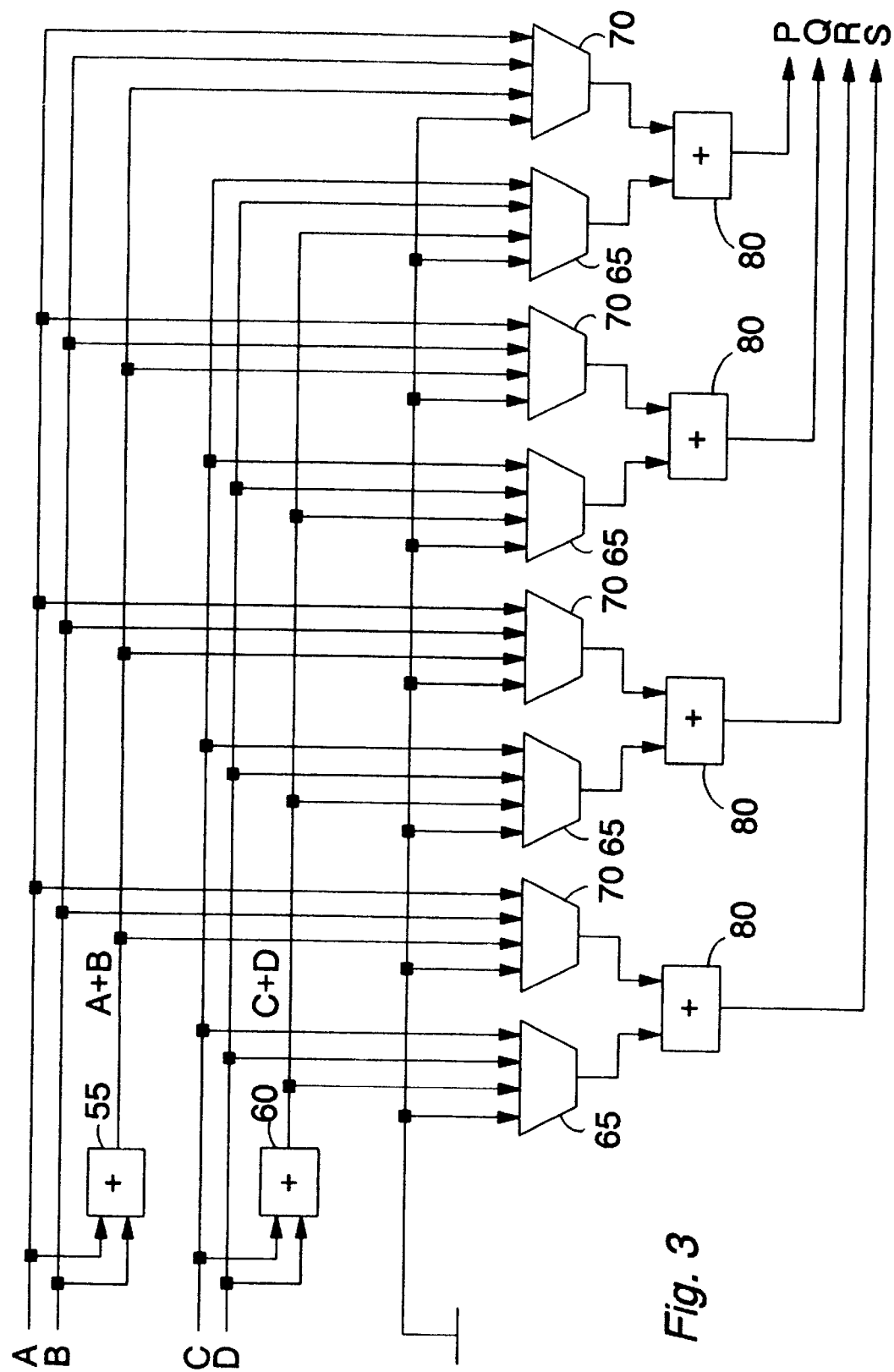
FIG. 3 is a schematic diagram of a multi-stage digital additive crosspoint matrix.

FIG. 3 is a schematic illustration of a multi stage digital additive crosspoint matrix, in which four input digital signals A, B, C and D are selectively combined to form four output digital signals P, Q, R and S. In FIG. 3, not all of the possible additive combinations of the four input signals are generated as intermediate signals in the first instance. Instead, the four input signals are arranged in two groups of two: the signals A and B, and the signals C and D. A set of intermediate signals is generated for each of the two groups, representing all the possible additive combinations of that group. In particular, an adder 55 generates the sum of the input signals A and B. Four intermediate signals representing A, B, A+B and 0 (logical zero) are supplied in parallel to four signal selectors 70. In a similar way, an adder 60 generates a signal representing the sum of the input signals C+D. A second group of four intermediate signals, representing C, D, C+D and 0 are supplied in parallel to four further signal selectors 65.

The signal selectors 65, 70 are grouped into pairs, each pair being connected to a respective adder 80. This means that each of the output digital signals P, Q, R and S is generated by a summation of the outputs of one of the signal selectors 65 and one of the signal selectors 70. The signal selectors 65 are individually controllable to select any possible additive combination of the two input signals C and D (including a zero signal) and the signal selectors 70 are individually controllable to select any possible additive combination of the input signals A and B. In this way, a summation of the output of one of these signal selectors 65 and one of the signal selectors 70 can be controlled to comprise any required additive combination of the four input signals A, B, C and D. For example, if an output signal representing a summation of the input signals A, B and D is required, the appropriate signal selector 70 is controlled to select the intermediate signal representing the sum of A and B, and the appropriate signal selector 65 is controlled to select the intermediate signal representing the input signal D. When the outputs of the two signal selectors are combined by the appropriate adder 80, the resulting output signal represents A+B+D.

The circuit of FIG. 3 requires only six adders 55, 60, 80. This may be contrasted with a circuit of the type shown in FIG. 1 for generating four output signals from four input signals, in which case m(n−1)=4.(4−1)=12 adders would be required. Furthermore, if a circuit of the type shown in FIG. 2 were used, eleven adders would be required. In general, a set of input signals can be divided into k sub-groups, with each output signal being a summation of a selected one of the intermediate signals generated from each sub-group. If the subgroups are denoted by an index i, the number of input signals in each sub-group by $w_i$, and the number of output signals by m, the required number of adders is given by the formula:

$$\text{no. of adders} = m(k-1) + \sum_{i=1}^{k} 2^{w_i} - (w_i + 1)$$

As an example, the various sub-group arrangements in a circuit for combining four input signals to generate four output signals are listed in the following table:

| Sub-group 1 | Sub-group 2 | Sub-group 3 | Sub-group 4 | No. of adders |
| --- | --- | --- | --- | --- |
| 2 | 2 | — | — | 6 |
| 3 | 1 | — | — | 8 |
| 2 | 1 | 1 | — | 9 |
| 4 | — | — | — | 11 |
| 1 | 1 | 1 | 1 | 12 |

The first row of entries in the table corresponds to the circuit shown in FIG. 3, in which the four input signals are arranged in two sub-groups of two signals each. In this case, six adders are required. The fourth row of entries corresponds to a circuit of the type shown in FIG. 2, in which intermediate signals corresponding to all possible additive combinations of the input signals are generated in the first instance. In the terminology used above, this would correspond to a single sub-group of four signals. The last row of entries in the table corresponds to a circuit of the type shown in FIG. 1, in which selectors are used to select which signals should be added to generate each output signal and in which intermediate digital signals are not used. In this case, the above formula reduces to m(n−1)=12, as described with reference to FIG. 1 above.

The relative merits of various sub-group arrangements can be tested using the above equation, and the most beneficial arrangement selected for use in a particular circuit. Generally the arrangement requiring the fewest adders will be the most beneficial, but in some cases a sub-grouping arrangement requiring more than the minimum possible number of adders may be desirable for ease or symmetry of implementation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Digital audio signal mixer for digitally mixing input digital audio signals, said mixer comprising:

means responsive to at least four input digital audio signals for generating a plurality of intermediate digital audio signals, wherein each of said intermediate digital audio signals comprises an additive combination of said input digital audio signals and wherein not all possible additive combinations of said input digital audio signals are generated;

a plurality of signal selectors each independently selecting among said plurality of intermediate digital audio signals and a logical value of zero; and output means, responsive to the intermediate digital audio signals selected by said plurality of signal selectors for producing at least one output digital audio signal representing a sum of the selected signals thereby mixing the selected signals with other selected signals, mixing the selected signals with said logical value of zero to pass said selected signals and mixing said logical value of zero with itself to inhibit signals depending upon the selections made by the plurality of signal selectors.

2. Digital audio signal mixer according to claim 1, wherein said plurality of intermediate digital audio signals comprises all possible discrete additive combinations of a subset of said input digital audio signals and wherein no single one of said input digital audio signals is utilized more than once to generate a particular one of said plurality of intermediate digital audio signals.

3. Digital audio signal mixer according to claim 1, wherein said output means comprises adding means.

4. Digital audio signal mixer according to claim 1, wherein said output means produces at least 4 output digital audio signals.

5. Multi-stage digital audio additive crosspoint matrix for digitally mixing input digital audio signals, said mixer comprising:

generating means, responsive to at least four input digital audio signals, for generating additive combinations of pairs of the input digital audio signals to produce a plurality of intermediate digital audio signals;

signal selector means, coupled to said generating means, for selecting between one or more of said plurality of intermediate digital audio signals and a logical value of zero; and adder means, coupled to said signal selector means, for producing at least one output digital audio signal representing a sum of one or more of the selected signals thereby mixing the selected signals with other selected signals, mixing the selected signals with said logical value of zero to pass said selected signals and mixing said logical value of zero with itself to inhibit signals depending upon the selections made by the signal selector means.

6. Matrix according to claim 5, wherein said signal selector means is operable such that said adder means produces any additive combination of the input digital audio signals.

7. Multi-stage digital audio signal mixer, each stage comprising:

a first adder for adding a first pair of input digital audio signals to produce a first intermediate audio sum signal;

a second adder for adding a second pair of input digital audio signals to produce a second intermediate audio sum signal;

a first signal selector, coupled to said first adder, for selecting among said first pair of input digital audio signals, said first intermediate audio sum signal and a logical value of zero;

a second signal selector, coupled to said second adder, for selecting among said second pair of input digital audio signals, said second intermediate audio sum signal and a logical value of zero;

a third adder, coupled to said first signal selector and to said second signal selector, for adding a signal selected by said first signal selector to a signal selected by said second signal selector thereby mixing the selected signals with other selected signals, mixing the selected signals with said logical value of zero to pass said selected signals and mixing said logical value of zero with itself to inhibit signals depending upon the selections made by the first and second signal selectors to produce an output audio signal.

8. Multi-stage digital audio signal mixer according to claim 7, wherein said first and second adders are operable to produce all additive combinations of the input digital audio signals, wherein said multi-stage digital audio signal mixer employs a total number of adders less than $m(n-1)$, m being the number of output digital audio signals and n being the number of input digital audio signals.

9. Multi-stage digital audio mixer of claim 8, wherein the number of said adders is equal to:

$$m(k-1)+\Sigma 2^{w_i}-(w_i+1)$$

wherein, said first pair of input audio signals and said first intermediate audio sum signal comprise a first sub-group, said second pair of input audio signals and said second intermediate audio sum signal comprise a second sub-group, k being a total number of sub-groups, i being an index number for each sub-group, and $w_i$ being the number of input signals input to each sub-group.

10. A digital audio mixer for generating an output digital audio signal by mixing a plurality of input digital audio signals, the mixer comprising:

means for generating at least two pluralities of intermediate digital audio signals from respective discrete subsets of the input digital audio signals, each intermediate digital audio signal being formed as a sum of the respective subset of the input digital audio signals;

signal selection means for selecting between respective ones of the intermediate digital audio signals from each of the pluralities of intermediate digital audio signals and a logical value of zero; and summing means for summing the selected intermediate digital audio signals thereby mixing the selected signals with other selected signals,. mixing the selected signals with said logical value of zero to pass said selected signals and mixing said logical value of zero with itself to inhibit signals depending upon the selections made by the signal selection means to generate the output digital audio signal.

11. The mixer according to claim 10, wherein each plurality of intermediate digital audio signals comprises all possible discrete additive combinations of the respective subsets of the input digital audio signals.

12. The mixer according to claim 10 wherein the signal selection means is operable to make a plurality of different selections from each of the pluralities of intermediate digital audio signals and wherein the summing means sums the intermediate digital audio signals of the respective selections to generate a corresponding plurality of different output digital audio signals.

13. A digital audio mixer for generating an output digital audio signal by mixing a plurality of input digital audio signals, the mixer comprising:

means for generating at least two pluralities of intermediate digital audio signals from respective discrete subsets of the input digital audio signals, each intermediate digital audio signal being formed as a sum of the respective subset of the input digital audio signals;

signal selection means for selecting any ones of the intermediate digital audio signals from each of the pluralities of intermediate digital audio signals; and summing means for summing the selected intermediate digital audio signals thereby mixing the selected signals with other selected signals, mixing the selected signals with said logical value of zero to pass said selected signals and mixing said logical value of zero with itself to inhibit signals depending upon the selections made by the signal selection means to generate the output digital audio signal.

14. A digital audio mixer for generating a plurality of different output digital audio signals from a plurality of input digital audio signals, the mixer comprising:

means for generating at least two pluralities of intermediate digital audio signals from respective discrete subsets of the input digital audio signals, each plurality of intermediate digital audio signals comprising all possible discrete additive combinations of the respective subsets of the input digital audio signals;

signal selection means for making a plurality of different selections from each of the pluralities of intermediate digital audio signals, each selection being between any of the intermediate digital audio signals of each plurality of intermediate digital audio signals and a logical value of zero; and summing means for summing the intermediate digital audio signals of the respective selections thereby mixing the selected signals with other selected signals, mixing the selected signals with said logical value of zero to pass said selected signals and mixing said logical value of zero with itself to inhibit signals depending upon the selections made by the signal selection means to generate corresponding output digital audio signals.

* * * * *